United States Patent [19]
Hartmann

[11] Patent Number: 5,528,416
[45] Date of Patent: Jun. 18, 1996

[54] COMPACT MULTIPLE FIELD-OF-VIEW ATTACHMENT

[75] Inventor: Rudolf Hartmann, Winter Park, Fla.

[73] Assignee: Martin Marietta Corporation, Bethesda, Md.

[21] Appl. No.: 463,278

[22] Filed: Jun. 5, 1995

[51] Int. Cl.$^6$ .......................... G02B 21/00; G02B 15/02
[52] U.S. Cl. .......................... 359/381; 359/673
[58] Field of Search .......................... 359/673, 381

[56] References Cited

U.S. PATENT DOCUMENTS

| | | | |
|---|---|---|---|
| 2,552,940 | 5/1951 | Cornut | 359/421 |
| 2,791,937 | 5/1957 | Leitz | 359/376 |
| 2,901,942 | 9/1959 | Tackaberry | 359/381 |
| 3,813,172 | 5/1974 | Walker | 359/381 |
| 3,881,804 | 5/1975 | Ikeda | 359/422 |
| 4,017,148 | 4/1977 | Taylor | 359/402 |
| 4,195,903 | 4/1980 | Kawase et al. | 359/376 |
| 4,262,989 | 4/1981 | Waters | 359/381 |
| 4,530,578 | 7/1985 | Kato | 359/381 |

Primary Examiner—Georgia Y. Epps
Assistant Examiner—Evelyn A. Lester
Attorney, Agent, or Firm—Burns, Doane, Swecker & Mathis

[57] ABSTRACT

An afocal field of view and focal length converter for an optical lens system includes a cube-shaped frame that is interposed on an optical axis of the lens system. Lenses are mounted in four faces of the frame to provide two reversible afocal pairs and two faces are left empty. The frame is rotatable about a first axis to position the afocal pairs in the optical axis for one of four conversion positions, and about a second axis, perpendicular to the first axis, to rotate the empty faces in the optical axis for a no conversion position.

9 Claims, 2 Drawing Sheets

COMPACT MULTIPLE FIELD-OF-VIEW ATTACHMENT

FIELD OF THE INVENTION

The present invention relates to lens systems for photographic and television and other uses.

BACKGROUND AND SUMMARY OF THE INVENTION

Afocal attachments are used to change the field-of-view and focal length of objective lens systems. Known attachments generally include two or more afocal elements mounted as pairs in a holding device. The holding device is inserted in the optical axis of the objective and can be rotated about an axis to position the lenses in a desired orientation to alter the field of view of the objective. Oriented in one direction through a pair of lenses, such attachments may increase the focal length, and, in the other direction, correspondingly decrease the focal length.

In devices where multiple afocal pairs are used, conventional rotating and positioning systems tend to require complex sliding or pivoting mechanisms and take up considerable space.

The present invention, generally, provides a device for changing the field-of-view of an objective with four conversions that is compact and simple in structure.

More particularly, the present invention provides a converter device for an optical lens system having an optical axis, the device comprising a mounting frame defining six faces in a cuboid arrangement which is disposed in the optical axis between the objective lens system and an object side of the viewing device. The device includes a first lens mounted on a first face of the frame, a second lens mounted on a second face of the frame, the second face being oppositely located and parallel to the first face, the first and second lenses forming a first afocal pair on a first axis. In addition, a third lens is mounted on a third face of the frame, and a fourth lens is mounted on a fourth face of the frame opposite and parallel to the third face, the third and fourth lenses forming a second afocal pair on a second axis perpendicular to the third and fourth refractive lenses.

According to another aspect of the invention, the lens mounted in the frame are refractive lenses.

According to another aspect of the invention, the fifth and sixth faces of the frame are left empty.

The mounting frame in accordance with the present invention is rotatable about a third axis perpendicular to the first and second axes for selectively aligning one of the first afocal pair and the second afocal pair with the optical axis.

The mounting frame is also rotatable about the first or the second axes for rotating both the first and second afocal pairs from the optical axis and positioning the fifth and sixth faces of the frame in the optical axis.

According to another aspect of the invention, the lenses making up each of the afocal pairs are selected to have opposite powers. For example, for each afocal pair, a first lens is a positive lens and the second lens is a negative lens. Each lens pair, therefore, provides a telephoto conversion or a wide angle conversion depending on the direction the pair is oriented.

Thus, the converter according to the invention is capable of providing five conversion conditions which include a zero conversion condition in which no afocal pair is interposed in the optical axis and the power of the system is the unaltered objective lens focal length.

BRIEF DESCRIPTION OF THE DRAWING FIGURES

The present invention can be further understood with reference to the following description in conjunction with the appended drawings.

FIG. 1 is a schematic of a field-of-view converter device according to the present invention; and, FIG. 2 shows a rotatable mounting frame for the field-of-view converter of FIG. 1.

DETAILED DESCRIPTION

Figure 1:
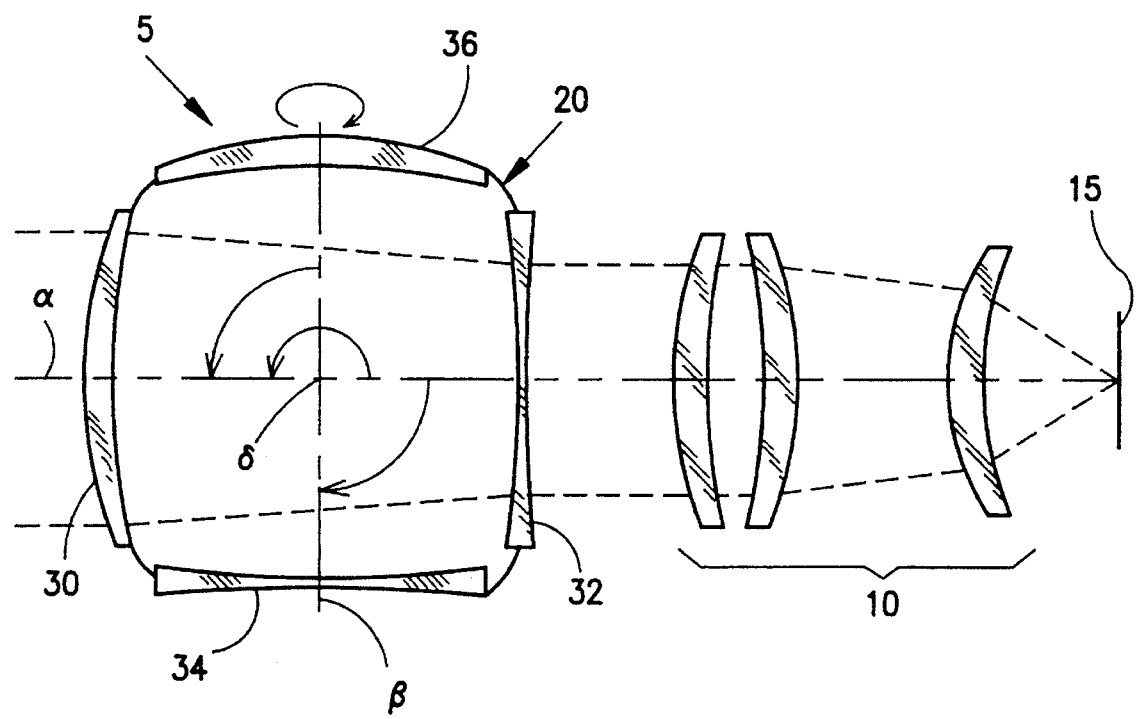

A converter 5 is shown as part of an optical device, for example a photographic or television lens. An objective lens system 10 is shown adjacent to the converter 5, and both the lens system 10 and the converter 5 are disposed on a common optical axis $\alpha$. The objective lens system 10 has a predetermined focal length and field-of-view. A focal plane 15 is shown in the rear of the objective lens system 10. In front of the focal plane 15 is an objective 10 and the converter device 5. The broken lines indicate an axial path of light rays through the combined device, eventually falling on the focal plane 15.

The converter 5 includes a frame 20 that is disposed so that the optical axis $\alpha$ passes through the center of the frame. The frame 20 includes mounting faces that are oriented in a generally cuboid arrangement, that is, the frame 20 defines six faces arranged as a cube. The frame 20 supports a plurality of lenses that are positioned as pairs on opposing, parallel faces of the frame. FIG. 1 shows single element lenses mounted on the frame. It is understood that a device according to the invention may include lens element groups or compound lenses.

As illustrated in FIG. 1, a first lens 30 and a second lens 32 are mounted on opposing faces of the frame 20. The first lens 30 is shown as being a positive lens and the second lens 32 is shown as a negative lens. The first and second lenses 30, 32 form a first afocal pair. The first afocal pair has a first power and field-of-view for light passing in the direction of the first lens 30 to the second lens 32. As indicated by the broken lines, light rays passing through the first afocal pair are shifted without focusing to increase the magnification and reduce the field-of-view. The first afocal pair also has a corresponding, inverse, second magnification and field-of-view for light passing first through the second lens 32 to the first lens 30.

A third lens 34 and a fourth lens 36 are mounted on opposite faces of the frame 20 on an axis $\beta$ perpendicular to the optical axis $\alpha$. The third lens 34 is a positive lens and the fourth lens 36 is a negative lens, similar to the first 30 and second lenses 32. The third and fourth lenses 34, 36 form a second afocal pair, having magnification and field-of-view properties in the manner of the first afocal pair.

According to a preferred embodiment of the invention, the first, second, third, and fourth lenses are refractive lenses. The converter according to the invention is not limited to refractive lenses, however, and may comprise diffractive surface optics.

The frame 20 is rotatable on an axis $\delta$ through 360° so that any of the lenses 30, 32, 34, and 36 may be positioned in front of the objective device. As may be understood, this provides four different conversions for the optical device.

The frame 20 is also rotatable about the axis β, which removes both the first and second afocal pairs from the optical axis α. Thus, the frame 20 may be positioned so that no conversion of the objective lens system 10 is provided. The arrows in the figure show how the frame 20 may be rotated through 90° stops about the axes α and β to position the afocal pairs relative to the optical axis.

The table below illustrates, by a non-limiting example, how a converter 5 according to the present invention may be used as a converter for an objective lens system 10 having a focal length of 100 mm and a field of view of 11.5°. In the chart, "frame position" indicates the orientation of the lenses 30, 32, 34, and 36 of the afocal pairs, the first numeral corresponding to the lens on the object side of the frame 20.

| CUBE POSITION | AFOCAL POWER | SYSTEM FOCAL LGTH | FIELD OF OF VIEW |
|---|---|---|---|
| 0 | 0 | 100 mm | 11.5° |
| 30–32 | 1.5x | 150 mm | 7.6° |
| 32–30 | 0.67x | 66.67 mm | 17.2° |
| 36–34 | 2x | 200 mm | 5.7° |
| 34–36 | 0.5x | 50 mm | 22.9° |

As may be seen, the lenses 30, 32, 34 and 36 may be selected to provide a range of telephoto (having a power greater than one) and wide angle (having a power less than one) conversions for the objective lens system. The lenses 30, 32, 34 and 36 may be selected to have a power as needed for the particular lens system, and are not limited to the examples shown.

The mounting system for the device, which rotates on two axes, provides a compact device 5 that may be simply installed as part of a larger lens system. The frame 20 may be provided with any suitable device to provide the rotation, for example, interrupted shaft mountings and gimbal-type devices.

Figure 2:
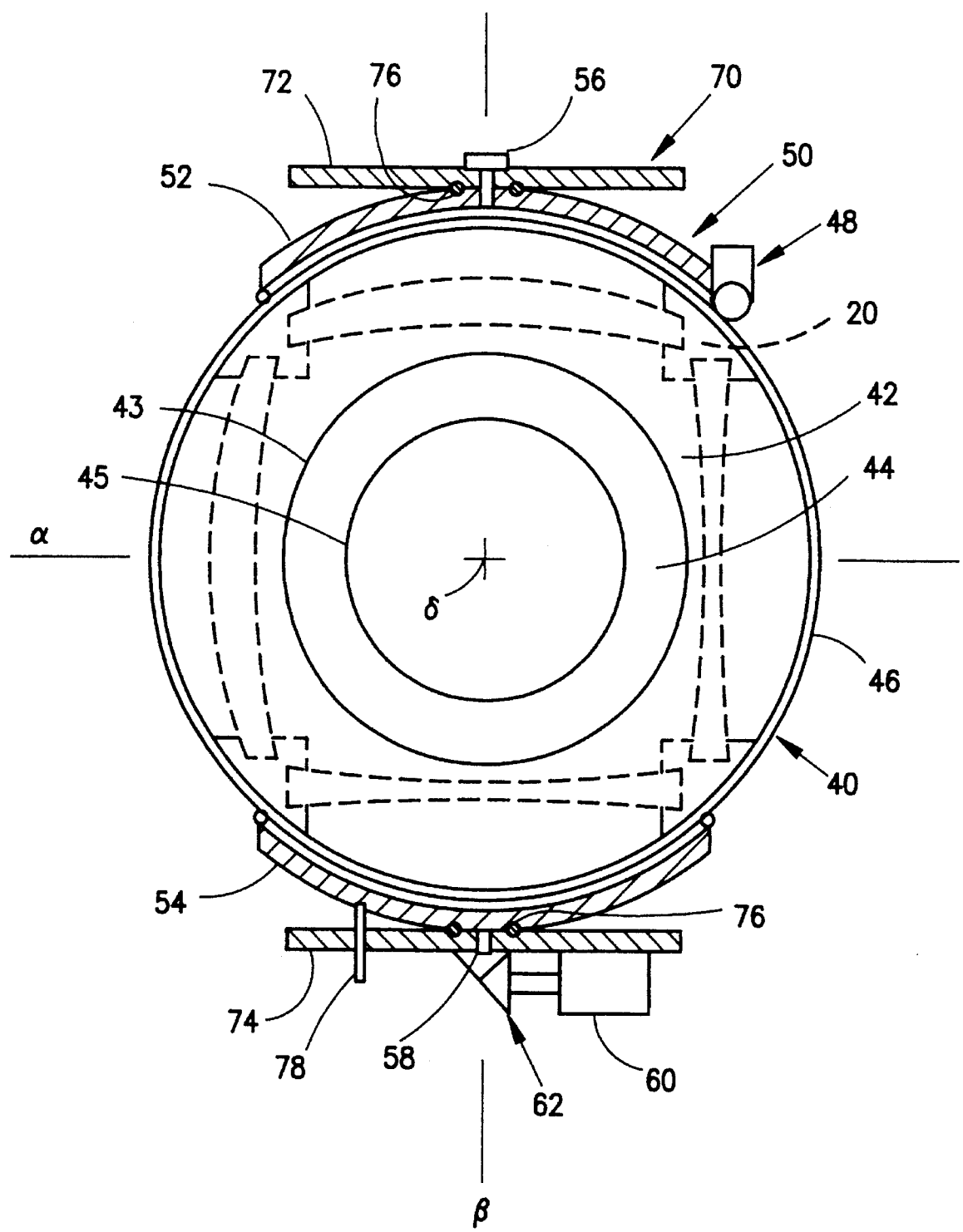

FIG. 2 illustrates a rotatable mounting system for the converter 5. The lens frame 20 is shown in the same orientation as in FIG. 1 and is supported in the mounting system by an inner rotatable cage 40. The inner rotatable cage 40 is mounted for rotation about the axis δ in an outer rotatable cage 50. The outer rotatable cage 50 is in turn mounted for rotation about the axis β in a fixed frame 70.

The inner rotatable cage 40 has an upper plate 42 and a lower plate 44, each having a central aperture 43, 45, respectively, The size of the upper plate aperture 43 and lower plate aperture 45 are chosen to correspond to the field-of-view of the basic objective system. The plates 42, 44 and apertures 43, 45 serve as light baffles to prevent stray light from reaching the image plane, which could reduce image performance. At the outer edge of the upper plate 42 is a ring gear element 46. A motor and gear system 48 carried on the outer rotatable cage 50 drive the inner rotatable cage 40 to selectably orient the lens pairs on the axis α, as further described above. Suitable bearings may be provided as shown to ensure smooth rotation of the inner rotatable frame 40. Indexing means (not illustrated), for example, spring balls and detents may be provided to help positively locate the stop positions of the inner cage 40. A spring loaded pin operated by a solenoid and corresponding holes (not illustrated) may be provided to lock the inner cage 40 in the desired positions.

The outer rotatable cage 50 is mounted for rotation about the axis β in the fixed frame 70. The outer rotatable cage 50 includes semicylindrical elements 52, 54 mounted on shafts 56, 58. The shafts 56, 58 are mounted in the fixed frame 70, in each of support elements 72, 74. A motor 60 and bevel gear 62 drive the rotatable cage 70 to rotate the lens pairs out of the axis α, thus, providing the zero conversion condition. Bearings 76 may also be provided for smooth rotation. An indexing pin 78 controlled by solenoid may be mounted in the fixed support element 74 to engage holes in the cylindrical element 54 corresponding to the two operative positions of the outer cage to lock the outer cage 50 in place.

The foregoing has described the preferred principles, embodiments and modes of operation of the present invention; however, the invention should not be construed as limited to the particular embodiments discussed. Instead, the above-described embodiments should be regarded as illustrative rather than restrictive, and it should be appreciated that variations, changes, and equivalents may be made by others without departing from the scope of the present invention as defined by the following claims.

What is claimed is:

1. In an optical viewing device having an optical axis, a field of view converter, comprising:

a mounting frame, disposed on the optical axis, defining six faces in a cuboid arrangement;

a first lens mounted on a first face of the frame;

a second lens mounted on a second face of the frame, the second face being oppositely located to the first face, the first and second lenses forming a first afocal pair on a first axis perpendicular to said first and second lenses;

a third lens mounted on a third face of the frame; and a fourth lens mounted on a fourth face of the frame opposite to the third face, the third and fourth lenses forming a second afocal pair on a second axis perpendicular to the third and fourth lenses;

wherein, the mounting frame is rotatable about a third axis for selectively and reversibly aligning one of the first afocal pair and the second afocal pair on an optical axis, and rotatable on one of the first and second axes for removing both the first and second afocal pairs from the optical axis.

2. The field of view converter of claim 1, wherein the first, second, third and fourth lenses are refractive lenses.

3. The field of view converter of claim 1, wherein the first lens is a positive lens and the second lens is a negative lens.

4. The field of view converter of claim 3, wherein the third lens is a positive lens and the fourth lens is a negative lens, the first afocal pair and second afocal pair having different powers.

5. An optical viewing device having an optical axis, comprising:

an objective lens;

a mounting frame defining six faces in a cuboid arrangement disposed in the optical axis adjacent to the objective lens;

a first lens mounted on a first face of the frame;

a second lens mounted on a second face of the frame, the second face being oppositely located to the first face, the first and second lenses forming a first afocal pair on a first axis perpendicular to said first and second lenses;

a third lens mounted on a third face of the frame; and a fourth lens mounted on a fourth face of the frame opposite to the third face, the third and fourth lenses forming a second afocal pair on a second axis perpendicular to the third and fourth lenses;

wherein, the mounting frame is rotatable about a third axis for selectively aligning one of the first afocal pair and the second afocal pair on the optical axis, and rotatable on one of the first and second axes for removing both the first and second afocal pairs from the optical axis.

6. The optical device of claim 5, wherein the first, second, third and fourth lenses are refractive lenses.

7. The optical device of claim 5, wherein the first lens is a positive lens and the second lens is a negative lens.

8. The optical device of claim 7, wherein the third lens is a positive lens and the fourth lens is a negative lens, the first afocal pair and the second afocal pair having different magnification powers.

9. The optical device of claim 5, wherein the mounting frame is disposed between the objective lens and an object side of the device.

* * * * *